(12) United States Patent
Burtscher

(10) Patent No.: US 8,171,550 B2
(45) Date of Patent: *May 1, 2012

(54) SYSTEM AND METHOD FOR DEFINING AND DETECTING PESTWARE WITH FUNCTION PARAMETERS

(75) Inventor: Michael Burtscher, Longmont, CO (US)

(73) Assignee: Webroot Inc., Broomfield, CO (US)

( * ) Notice: Subject to any disclaimer, the term of this patent is extended or adjusted under 35 U.S.C. 154(b) by 1486 days.

This patent is subject to a terminal disclaimer.

(21) Appl. No.: 11/462,943

(22) Filed: Aug. 7, 2006

(65) Prior Publication Data

US 2008/0034430 A1    Feb. 7, 2008

(51) Int. Cl.
G06F 21/00        (2006.01)
(52) U.S. Cl. ............... 726/23; 726/22; 726/24; 714/15; 714/38.14; 717/126
(58) Field of Classification Search ............... 726/22–24
See application file for complete search history.

(56) References Cited

U.S. PATENT DOCUMENTS

| | | | |
|---|---|---|---|
| 5,623,600 | A | 4/1997 | Ji et al. |
| 5,920,696 | A | 7/1999 | Brandt et al. |
| 5,951,698 | A | 9/1999 | Chen et al. |
| 6,069,628 | A | 5/2000 | Farry et al. |
| 6,073,241 | A | 6/2000 | Rosenberg et al. |
| 6,092,194 | A | 7/2000 | Touboul |
| 6,154,844 | A | 11/2000 | Touboul |
| 6,167,520 | A | 12/2000 | Touboul |
| 6,310,630 | B1 | 10/2001 | Kulkarni et al. |
| 6,397,264 | B1 | 5/2002 | Stasnick et al. |
| 6,405,316 | B1 | 6/2002 | Krishnan et al. |
| 6,460,060 | B1 | 10/2002 | Maddalozzo, Jr. et al. |
| 6,480,962 | B1 | 11/2002 | Touboul |
| 6,535,931 | B1 | 3/2003 | Celi, Jr. |
| 6,611,878 | B2 | 8/2003 | De Armas et al. |
| 6,633,835 | B1 | 10/2003 | Moran et al. |
| 6,667,751 | B1 | 12/2003 | Wynn et al. |
| 6,701,441 | B1 | 3/2004 | Balasubramaniam et al. |
| 6,772,345 | B1 | 8/2004 | Shetty |
| 6,785,732 | B1 | 8/2004 | Bates et al. |

(Continued)

FOREIGN PATENT DOCUMENTS

WO    WO2007007326    *    7/2006

(Continued)

OTHER PUBLICATIONS

Nick Petroni, "Copilot-Coprocessor-based Kernel Runtime Integrity Monitor", Aug. 2004, USENIX Association.*

(Continued)

*Primary Examiner* — Taghi Arani
*Assistant Examiner* — Gregory Lane
(74) *Attorney, Agent, or Firm* — Cooley LLP

(57) ABSTRACT

A system and method for defining and detecting pestware is described. In one embodiment, a pestware file is received and at least a portion of the pestware file is placed into a processor-readable memory. A plurality of execution paths within code of the pestware file are followed and for each of a plurality of selected function calls within the execution paths of the pestware file, at least one parameter from each of the function calls is retrieved so as to obtain a plurality of parameters. A representation of each of the parameters is then stored in a processor-readable pestware-definition file, which is sent to a plurality of client devices.

11 Claims, 3 Drawing Sheets

U.S. PATENT DOCUMENTS

| | | |
|---|---|---|
| 6,804,780 B1 | 10/2004 | Touboul |
| 6,813,711 B1 | 11/2004 | Dimenstein |
| 6,829,654 B1 | 12/2004 | Jungek |
| 6,910,134 B1 | 6/2005 | Maher et al. |
| 6,965,968 B1 | 11/2005 | Touboul |
| 6,966,059 B1* | 11/2005 | Shetty et al. ............. 717/172 |
| 7,058,822 B2 | 6/2006 | Edery et al. |
| 7,107,617 B2 | 9/2006 | Hursey et al. |
| 7,210,168 B2* | 4/2007 | Hursey et al. ............. 726/24 |
| 2002/0162015 A1 | 10/2002 | Tang |
| 2002/0166063 A1 | 11/2002 | Lachman et al. |
| 2003/0065943 A1 | 4/2003 | Geis et al. |
| 2003/0074581 A1 | 4/2003 | Hursey et al. |
| 2003/0101381 A1 | 5/2003 | Mateev et al. |
| 2003/0159070 A1 | 8/2003 | Mayer et al. |
| 2003/0217287 A1 | 11/2003 | Kruglenko |
| 2004/0030914 A1 | 2/2004 | Kelley et al. |
| 2004/0034794 A1 | 2/2004 | Mayer et al. |
| 2004/0064736 A1 | 4/2004 | Obrecht et al. |
| 2004/0080529 A1 | 4/2004 | Wojcik |
| 2004/0143763 A1 | 7/2004 | Radatti |
| 2004/0187023 A1 | 9/2004 | Alagna et al. |
| 2004/0225877 A1 | 11/2004 | Huang |
| 2004/0255165 A1* | 12/2004 | Szor .......................... 713/201 |
| 2005/0021994 A1* | 1/2005 | Barton et al. ............. 713/200 |
| 2005/0038697 A1 | 2/2005 | Aaron |
| 2005/0091558 A1* | 4/2005 | Chess et al. ................ 714/38 |
| 2005/0138433 A1 | 6/2005 | Linetsky |
| 2005/0154885 A1 | 7/2005 | Viscomi et al. |
| 2005/0177868 A1 | 8/2005 | Kwan |
| 2006/0074896 A1* | 4/2006 | Thomas et al. ............... 707/4 |
| 2006/0075494 A1 | 4/2006 | Bertman et al. |
| 2006/0075500 A1* | 4/2006 | Bertman et al. ............. 726/24 |
| 2006/0075501 A1 | 4/2006 | Thomas et al. |
| 2006/0080637 A1 | 4/2006 | Treit |
| 2006/0161988 A1 | 7/2006 | Costea et al. |
| 2007/0006311 A1* | 1/2007 | Barton et al. ............. 726/24 |

FOREIGN PATENT DOCUMENTS

WO PCT/US2006/025378      9/2007

OTHER PUBLICATIONS

Alexander Volynkin, "Evaluation of run-time detection of self-replication in binary executasble malware" Proceedings of the 2006 IEEE.*
U.S. Appl. No. 11/462,956, filed Aug. 7, 2006, Michael Burtscher.
Codeguru, Three Ways to Inject Your Code Into Another Process, by Robert Kuster, Aug. 4, 2003, 22 pgs.
Codeguru, Managing Low-Level Keyboard Hooks With the Windows API for VB .Net, by Paul Kimmel, Apr. 18, 2004, 10 pgs.
Codeguru, Hooking the Keyboard, by Anoop Thomas, Dec. 13, 2001, 6 pgs.
Illusive Security, Wolves in Sheep's Clothing: malicious DLLs Injected Into trusted Host Applications, Author Unknown, http://home.arcor.de/scheinsicherheit/dll.htm 13 pgs.
DevX.com, Intercepting Systems API Calls, by Seung-Woo Kim, May 13, 2004, 6 pgs.
Microsoft.com, How to Subclass a Window in Windows 95, Article ID 125680, Jul. 11, 2005, 2 pgs.
MSDN, Win32 Hooks by Kyle Marsh, Jul. 29, 1993, 15 pgs.
PCT Search Report, PCT/US05/34874, Jul. 5, 2006, 7 Pages.
Yurcik, William et al., A Planning Framework for Implementing Virtual Private Networks, Jun. 2001, IT Pro, IEEE, pp. 41-44.

* cited by examiner

SYSTEM AND METHOD FOR DEFINING AND DETECTING PESTWARE WITH FUNCTION PARAMETERS

RELATED APPLICATIONS

The present application is related to commonly owned and assigned application Ser. No. 11/462,956, entitled SYSTEM AND METHOD FOR DEFINING AND DETECTING PESTWARE, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer management. In particular, but not by way of limitation, the present invention relates to systems and methods for detecting and removing pestware.

BACKGROUND OF THE INVENTION

Personal computers and business computers are continually attacked by trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actually beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect and remove some pestware, but many types of pestware are difficult to detect with typical techniques. For example, pestware may be obfuscated with encryption techniques so that a pestware file stored on a system hard drive may not be readily recognizable as a file that has spawned a pestware process. In yet other instances, pestware is known to be polymorphic in nature so as to change its code, data, size and/or its starting address in memory. In yet other instances, variants of known pestware are developed that alter relatively little of the functional aspects of the pestware, yet render the pestware undetectable.

Although present pestware-detection systems detect some or even most pestware, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for defining and detecting pestware. In one embodiment, a pestware file is received and at least a portion of the pestware file is placed into a processor-readable memory. A plurality of execution paths within code of the pestware file are followed and for each of a plurality of selected function calls within the execution paths of the pestware file, at least one parameter from each of the function calls is retrieved so as to obtain a plurality of parameters. A representation of each of the parameters is then stored in a processor-readable pestware-definition file, which is sent to a plurality of client devices where the pestware-definition file is compared against suspect files.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
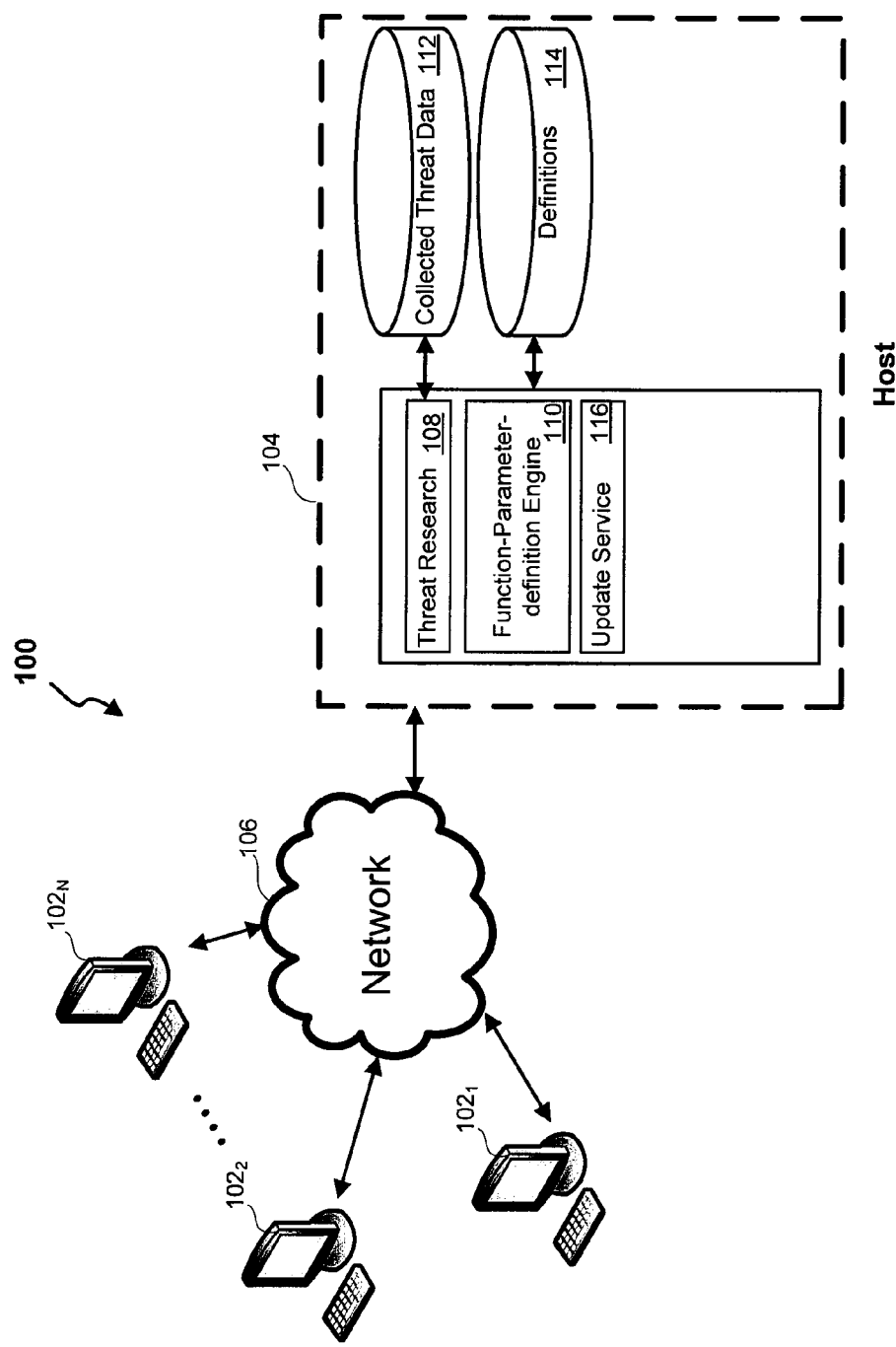
FIG. 1 is a block diagram depicting an environment in which several embodiments of the invention may be implemented.

Referring now to the drawings, where like or similar elements are designated with identical reference numerals throughout the several views. Referring first to FIG. 1, shown is a block diagram depicting an environment 100 in which several embodiments of the present invention are implemented.

As shown, N protected computers $102_{1-N}$ are coupled to a host 104 via a network 106 (e.g., the Internet). The host 104 in this embodiment includes a threat research portion 108 and a function-parameter definition engine 110. Also depicted are data storage devices 112, 114 that include collected threat data 112 and function-parameter-based definitions 114. The term "protected computer" is used herein to refer to any type of computer system, including personal computers, handheld computers, servers, firewalls, etc.

In accordance with several embodiments, the threat research portion 108 identifies and stores pestware threats in the threat database 112. The threat research portion 108 may, for example, actively search for pestware using bots that scour the Web for potential pestware. In addition, one or more of the N protected computers $102_{1-N}$ may provide data, via the network 106, about potential pestware to the threat research portion 108.

The function-parameter definition engine 110 in this embodiment is configured to retrieve the collected pestware threats from the threat database 112 and generate function-parameter-based definitions that are stored in the definition database 114. An update service 116 then makes the function-parameter-based definitions available to the computers $102_{1-N}$. The illustrated arrangement of these components is logical and not meant to be an actual hardware diagram or a detailed architecture of an actual software implementation. Thus, the components can be combined or further separated in an actual implementation. Moreover, in light of this specification, the construction of each individual component is well-known to those of skill in the art.

As discussed further herein, using function-parameter-based pestware definitions provides several advantages over known pestware detection methodologies. In general, the function-parameter-based definitions include a collection of data that is dependent upon the overall functionality of the pestware files so that minor variations to a pestware file do not render the pestware undetectable. In many embodiments for example, the function-parameter-based definitions include data that is dependent upon occurrences of function calls and the parameters of the function calls.

In several embodiments for example, the function-parameter-based definitions may include both data that captures the occurrences of system calls and one or more parameters for each system call. As an example, string parameters (e.g., file names), integer parameters, and/or pointers may be collected for each function call and stored to create a function-parameter-based definition. In addition, in some variations an identifier of the function call may also be stored in connection with the parameters. One of ordinary skill in the art will appreciate, in light of this disclosure, that the stored representation of the parameters may be actual characters, a digital signature (e.g., hash function) or any other reproducible representation of the parameters.

Although not required, in some embodiments the function-parameter-based definitions may also include data that is dependent upon an order of the function calls within the pestware code. As discussed further herein, the function parameters and their respective locations may be represented in a function-parameter graph that may be used as a pestware definition.

Notably, the identity of each function call (e.g., system call) need not be captured in the function-parameter-based definitions in order for the function-parameter-based definitions to provide a useful definition of the pestware. This is in contrast to known pestware detection techniques, which parse through files to locate commands which are compared with a listing of operations that are known to be potentially dangerous operations. In other words, instead of analyzing a file to determine if it includes commands that carry out operations known to be dangerous, in many embodiments of the present invention, files are analyzed based upon parameters of function calls irrespective of the functions (e.g., kernel functions) associated with the functions calls.

Figure 2:
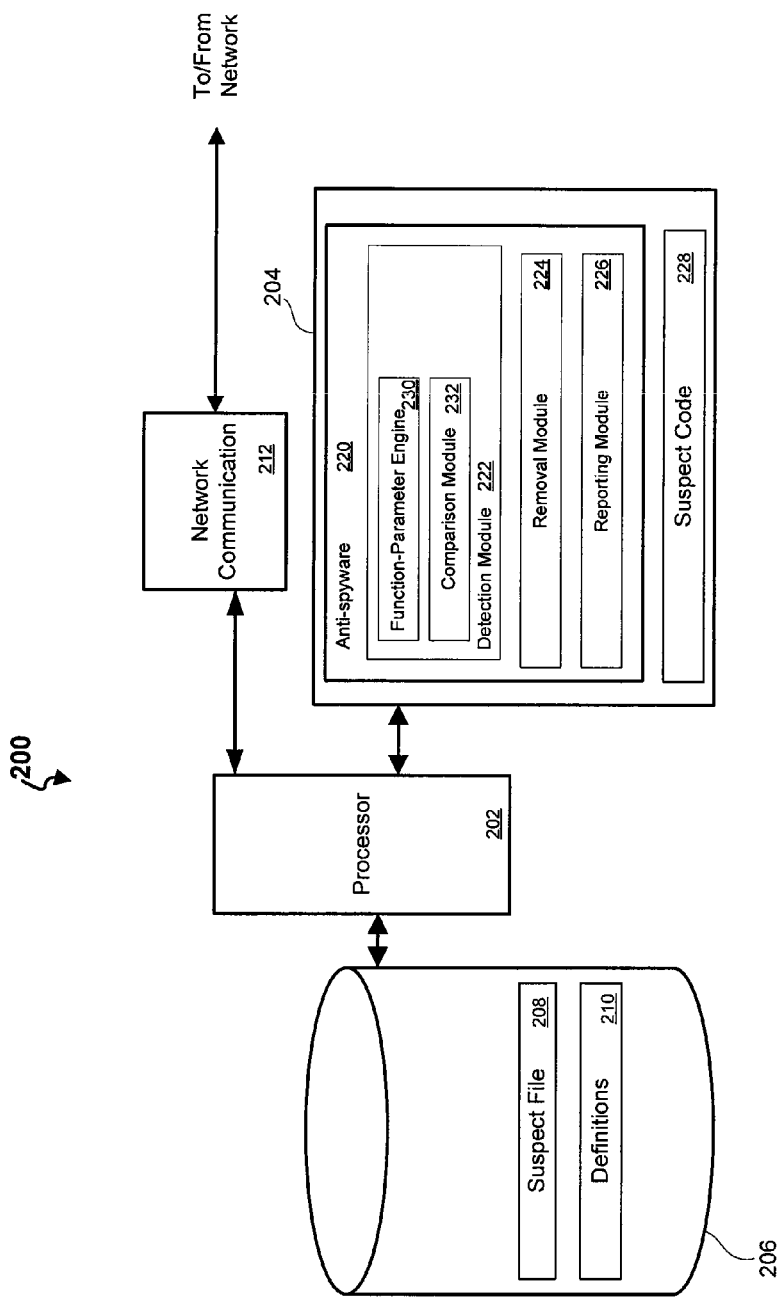
FIG. 2 is a block diagram depicting one embodiment of a protected computer.

Referring next to FIG. 2, shown is a block diagram 200 of one embodiment of a protected computer $102_{1-N}$ depicted in FIG. 1. This implementation includes a processor 202 coupled to memory 204 (e.g., random access memory (RAM)), a file storage device 206, and network communication module 212.

As shown, the file storage device 206 provides storage for a collection files which includes a suspect file 208 (e.g., received via the network 106 from a URL) and function-parameter-based definitions 210 received from the update service 116 of the host 104. The file storage device 206 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 206, which is depicted for convenience as a single storage device, may be realized by multiple (e.g., distributed) storage devices.

As shown, an anti-spyware application 220 includes a detection module 222, a removal module 224, and a reporting module 226 which are implemented in software and are executed from the memory 204 by the processor 202. In addition, suspect-process code 228, which corresponds to the suspect file 208, is also depicted in memory 204.

The anti-spyware application 214 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the present invention. It should be recognized that the illustrated arrangement of these components is logical and not meant to be an actual hardware diagram or a detailed architecture of an actual software implementation. Thus, the components can be combined or further separated in an actual implementation. Moreover, in light of this specification, the construction of each individual component is well-known to those of skill in the art.

Also shown within the detection module 222 are a function-parameter engine 230 and a comparison module 232. In the exemplary embodiment, the function-parameter engine 230 is configured to collect parameters from function calls within the suspect code 228 and the comparison module 232 is configured to compare the parameters from the suspect code 228 with the function-parameter-based definitions 210 to assess whether the suspect code 228 is likely pestware code. Depending upon the results of the comparison carried out by the comparison module, the suspect file 208 and code 228 may be removed and/or a user of the computer 200 is notified about the likelihood the suspect file 208 is a pestware file.

The configuration of the function-parameter engine 230 may vary depending upon the content of the function-parameter-based definitions. For example, if the function-parameter definition engine 110 generates function-parameter-based definitions that include a representation of function parameters (e.g., a hash or check sum) and the relative locations of the function calls for each pestware file, then the function-parameter engine 230 may be configured to generate the same type of representation of function calls along with information that captures the relative locations of the function calls so that the parameters collected by the function-parameter engine 230 is comparable with the function-parameter-based definitions 210.

Figure 3:
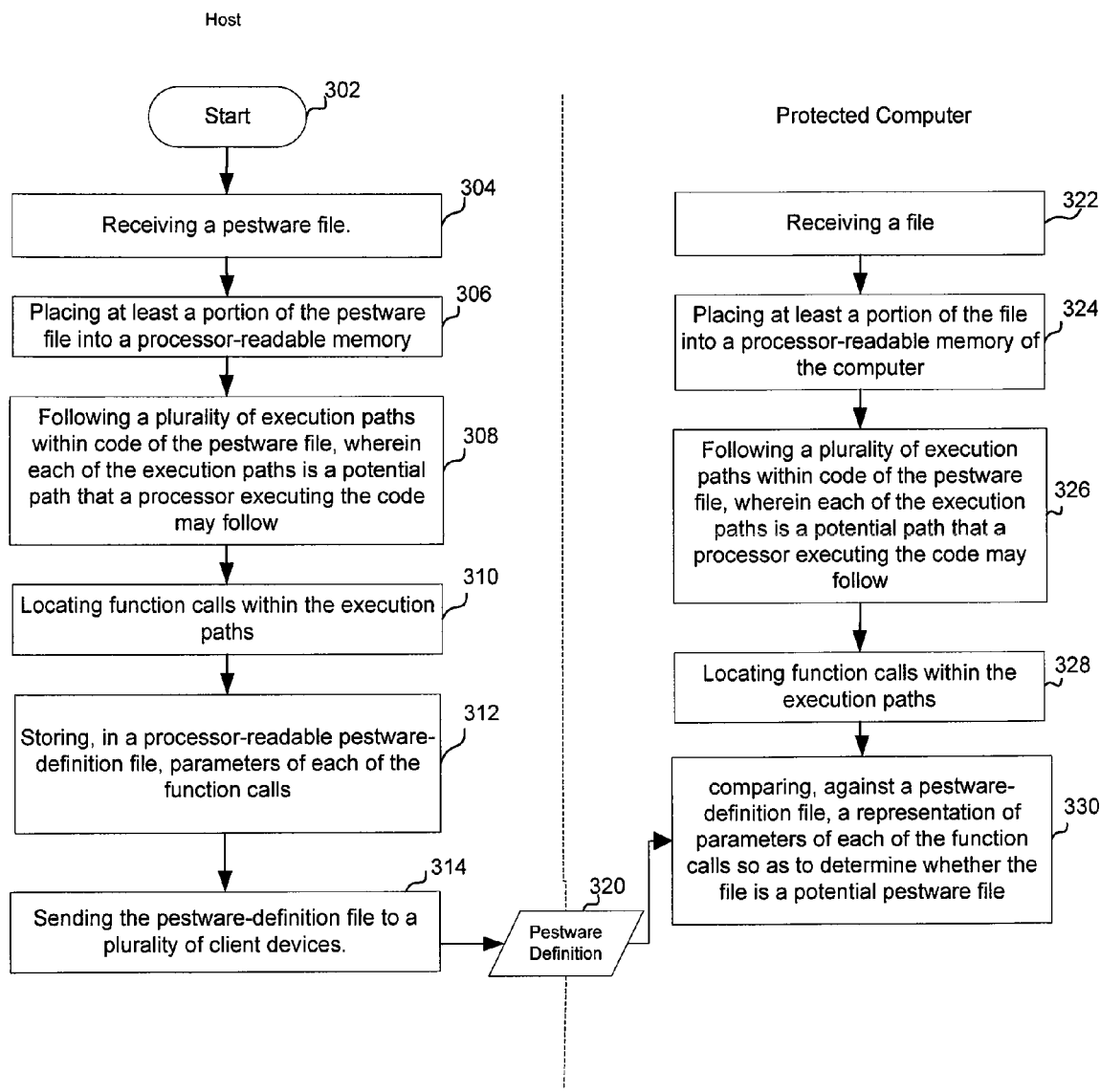
FIG. 3 is a flowchart depicting steps traversed in accordance with an exemplary embodiment of the present invention.

Referring next to FIG. 3, shown is a flow chart depicting a process for generating function-parameter-based definitions and a process for using the function-parameter-based definitions to analyze suspect code. While referring to FIG. 3, simultaneous reference will be made to FIGS. 1 and 2, but it should be recognized that the processes depicted in FIG. 3 are certainly not limited to being implemented in the exemplary embodiments depicted in FIGS. 1 and 2.

As shown in FIG. 3, initially a pestware file is received at a host site (Blocks 302, 304), and at least a portion of code from the file is placed in a processor-readable memory (Block 306). Referring to FIG. 1, for example, the pestware file may be identified as pestware by the threat research module 108 and stored in the threat database 112 so that it may be retrieved by the function-parameter-definition engine 110.

Once code of the pestware file has been retrieved, a plurality of potential-execution paths within the code are followed (Block 308), and function calls (e.g., system calls) within the execution paths are located (Block 310). For example, starting with an entry point of the code from the pestware file, the code may be followed until there is a conditional jump in the code, which separates the path into two paths. Each of the separate paths is then followed, and if each of the separate paths splits into additional paths, then each of the additional paths is also followed.

In some embodiments instructions in the pestware code that are not jumps or conditional jumps are ignored, and in embodiments where system calls are located, calls to addresses made within the code of the pestware may be assumed to be non-system calls and also ignored.

As shown in FIG. 3, in several embodiments a representation of the parameters of each located function call within the code is stored in a processor-readable pestware-definition file (Block 312). Although not required, in some embodiments, in addition to storing parameters for each function call, information about the relative locations of the function calls in the code is also stored in connection with the stored parameters.

In one embodiment for example, in connection with each parameter, a representation of the address of the associated function call is stored along with information that connects each function call with other function calls. As an example, the representation of the address may be the address itself, a check sum, or a hash of the address, and the information connecting the function calls may be information that relates the function calls to one another by the paths in the code where the function calls occur. It should be recognized that using an address of each system call is merely one way of attaching an identifier to each call. Moreover, the actual system functionality associated with each function calls need not be known.

Although in many embodiments the function associated with each function call is not determined, it beneficial in these embodiments to attach an identifier to the function calls so that if a call is repeated, there is a way of recognizing and tracking the number of times a particular function call is made. It is contemplated, for example, that the repetition of particular function calls as well as the parameters of each function call may be used to construct a definition for the pestware.

In embodiments where the relative locations of the function calls are captured, data representing a tree-shaped graph may stored in the pestware-definition file that is characterized by branches that include the function calls (and function-call parameters), and nodes that correspond to conditional jumps within the code. To simplify the tree, and hence the quantity of data associated with the tree, branches that do not include function calls (e.g., system calls) may be ignored. It has been found that, even when the branches that do not contain function calls are ignored, comparing a graph-based pestware definition with a graph generated from a suspect file (e.g., the suspect file) may be a processor-intensive process. As a consequence, in many variations where a graph is generated, the graph is simplified by removing cycles in the tree-shaped graph to create a simplified tree. Although data is missing, it has been found that graph-based pestware definitions may be simplified in this manner and yet be effective to identify pestware.

The extent to which a parameter graph (if created) is simplified may vary depending upon factors including the accuracy desired, the processing capabilities of the computer and/or the desired rate at which files are scanned. Although certainly not required, it has been found that a graph may be simplified so that it is linear representation of the order in which occurrences of the function calls (and function-call parameters) occur. For example, the graph may be a linear parameter graph that includes data that defines an order in which system calls are made.

In some instances, pestware is designed to include conditional jumps and/or function calls that include dynamic addresses. For example, pestware may be designed so that an address is loaded into a register and a jump instruction then jumps to the value in the register. As a consequence, in some embodiments when a graph is assembled, instructions that precede the jump or call are emulated to determine the value of the register. In this way, more call and jump destinations may be determined and a more complete graph may be assembled.

As depicted in FIG. 3, once a pestware definition file generated, it is sent to one or more client computers (e.g., the N protected computers $102_{1-N}$). In many embodiments the host 104 performs research to identify new pestware threats and generates pestware definitions in accordance with Blocks 302-312 on an ongoing basis, and the N protected computers $102_{1-N}$ periodically receive the updated definitions.

From the perspective of a protected computer, when a file is received at the protected computer (e.g., via the network communication module 212 or portable media), at least a portion of the file is placed in processor-readable memory (e.g., memory 204) of the computer (Blocks 322, 324). Once in memory, a plurality of execution paths within the code are followed, and function calls within the execution paths are located (Blocks 326, 328). As will be appreciated by one of ordinary skill in the art, the manner in which the steps depicted by Blocks 326 and 328 is carried out may vary, but these steps are dependent upon how the pestware definition file is generated at Blocks 308-310. For example, if system calls are identified in Block 310, then system calls are also identified in Block 328.

As shown in FIG. 3, a representation of the parameters of each of the function calls located in Block 328 is compared against the pestware definition file generated at Block 312 to determine whether the file is a potential pestware file (Block 330).

In embodiments where the pestware definition includes relative locations of function calls, the relative locations of the function calls within the code of the analyzed file is compared against the relative locations of the function calls in the pestware-definition file. In some of these embodiments a comparison of locations of identifiers of the function calls of the analyzed file and the pestware-definition file is made. As discussed, the manner in which each function call is represented may be arbitrary in that each function call may be given an identifier that may or may not connote the actual function associated with the function call.

When comparing locations of each of the function calls and function-call parameters, in many embodiments the longest matching sequence of function parameters between the pestware-definition file and the analyzed file is found.

One of ordinary skill in the art, in light of this disclosure, will appreciate that a match between some types of parameters are a stronger indication that the analyzed file is a pestware file. As an example, string parameters typically include a lot of information and a match between string parameters relative to a match between integer parameters, for example, provides a stronger indication that the analyzed file is a pestware file. As a consequence, in some embodiments parameters are weighted so that if, for example, a match is found between a string parameter of the analyzed file and the pestware definition, that match is weighted more heavily than a match between integer parameters.

Beneficially, comparing function parameters of a suspect file with function parameters of a pestware definition makes it more difficult for producers of pestware to effectively disguise pestware with minor alterations. Specifically, due to time and cost considerations, pestware producers are more likely to make alterations that affect how pestware code appears, but not how the pestware code operates. And function parameters are generally determined by how the code operates. As a consequence, unless a pestware file is substantially altered, so that the functionality of the pestware is altered, the pestware detection techniques described herein remain effective.

It should be recognized that the comparison between the pestware-definition file and the file being analyzed may generate substantially less than a 100 percent match, and yet, provide a strong indication that the analyzed file is a pestware file. For example, in many instances pestware producers are more inclined to add functionality to their pestware offerings. And when adding new functionality, the existing core functionality is often left in place. As a consequence, if the additional functionality corresponds to 30 percent of the function parameters in an enhanced pestware file, a match between 60 percent of the parameters of the enhanced pestware file and a pestware-definition based upon the original pestware file strongly suggests that the enhanced pestware file is indeed pestware.

Similarly, if a portion of an original pestware file is removed or replaced, there may be substantially less than 100 percent match between the pestware-definition file and the enhanced pestware file. But if the remaining portion of original pestware file is a substantial portion of the enhanced pestware file (e.g., the remaining portion includes 60 percent of the function parameters of the enhanced file) there may still be enough matches (e.g., 50 percent) between the original pestware-definition and the enhanced pestware file to at least render the analyzed file a potential pestware file.

In addition, it is contemplated that, based upon the extent the pestware-definition matches the analyzed file, the pestware file may be quarantined, removed or a user of the computer may be informed about the likelihood that the analyzed file is a pestware file.

In conclusion, the present invention provides, among other things, a system and method for defining and detecting pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for generating pestware definitions comprising:
   receiving a pestware file;
   placing at least a portion of the pestware file into a processor-readable memory;
   following a plurality of execution paths within code of the pestware file, wherein each of the execution paths is a potential path that a processor executing the code may follow;
   retrieving, for each of a plurality of selected function calls within the code of the pestware file, at least one parameter from each of the function calls so as to obtain a plurality of parameters;
   storing, in a processor-readable pestware-definition file, a representation of each of the parameters; and
   sending the pestware-definition file to a plurality of client devices;
   wherein the selected function calls are selected on the basis that the selected function calls include calls to addresses of the processor-readable memory that are outside of the memory occupied by the code of the pestware file.

2. The method of claim 1, wherein the storing includes storing relative locations of where, within the code of the pestware file, each of the function calls associated with the parameters occur.

3. The method of claim 1, wherein the selected function calls are system calls.

4. The method of claim 1 including:
   simplifying the representation of the relative locations so as to create a simplified representation of the relative locations, wherein the storing includes storing the representation as the simplified representation.

5. The method of claim 1 wherein the retrieving includes:
   retrieving a string that is indicative of a file name.

6. The method of claim 1, wherein the representation of each of the parameters includes a digital signature of each of the parameters.

7. The method of claim 1, wherein the representation of each of the parameters is a textual representation of each of the parameters.

8. A method for detecting pestware on a computer comprising:
   receiving a file;
   placing at least a portion of the file into a processor-readable memory of the computer;
   following a plurality of execution paths within code of the pestware file, wherein each of the execution paths is a potential path that a processor executing the code may follow;
   retrieving, for each of a plurality of selected function calls within the code of the pestware file, at least one parameter from each of the function calls so as to obtain a plurality of parameters;
   comparing the plurality of parameters with parameters within a processor-readable pestware-definition file so as to determine whether the file is a potential pestware file; and
   quarantining the file in the event the plurality of parameters match a minimum percentage of parameters within the processor-readable pestware-definition file;
   wherein the retrieving, for each of a plurality of selected function calls within the code of the pestware file, at least one parameter includes identifying calls to addresses to portions of the processor-readable memory that are outside of the memory occupied by the code of the pestware file.

9. The method of claim 8, wherein the identifying includes identifying system call parameters within the execution paths.

10. The method of claim 8 including:
    bypassing, while following the plurality of execution paths, parameters other than system-call parameters and jump instructions.

11. The method of claim 8 including:
    alerting a user of the computer in the event the particular function-call parameters within the code match a minimum percentage of function-call parameters in the pestware-definition file.

* * * * *